United States Patent
Beckman et al.

(10) Patent No.: US 10,807,731 B2
(45) Date of Patent: Oct. 20, 2020

(54) FLOATING MOTOR MOUNT FOR UNMANNED AERIAL VEHICLES

(71) Applicant: Amazon Technologies, Inc., Seattle, WA (US)

(72) Inventors: Brian C. Beckman, Newcastle, WA (US); Matthew Lee Skeels, Camano Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 601 days.

(21) Appl. No.: 14/866,721

(22) Filed: Sep. 25, 2015

(65) Prior Publication Data

US 2017/0088280 A1    Mar. 30, 2017

(51) Int. Cl.
 *B64D 27/26* (2006.01)
 *B64C 39/02* (2006.01)

(52) U.S. Cl.
 CPC ............ *B64D 27/26* (2013.01); *B64C 39/024* (2013.01); *B64C 2201/024* (2013.01); *B64C 2201/042* (2013.01); *B64C 2201/14* (2013.01); *B64C 2220/00* (2013.01)

(58) Field of Classification Search
 CPC .................................................... B64D 27/26
 See application file for complete search history.

(56) References Cited

U.S. PATENT DOCUMENTS

| 2,020,092 A | 11/1935 | Allen |
| 2,215,743 A | 9/1940 | Saurer |
| 2,955,795 A | 10/1960 | Giles |
| 3,399,851 A | 9/1968 | Racca |

(Continued)

FOREIGN PATENT DOCUMENTS

| CN | 102518727 A | 6/2012 |
| CN | 202381624 U | 8/2012 |

(Continued)

OTHER PUBLICATIONS

"How to make a Hyde engine mount," as downloaded from http://www.ofremmi.info/Articles/Articles/hyde-feste.PDF, on Aug. 30, 2015, p. 1, as provided in Norwegian.

(Continued)

*Primary Examiner* — Charles A Fox
*Assistant Examiner* — Michael E Butler
(74) *Attorney, Agent, or Firm* — Athorus, PLLC

(57) ABSTRACT

A motor mount assembly is provided for coupling a propeller motor to a body of an unmanned aerial vehicle (UAV). The motor mount assembly includes a floating portion and acts to attenuate frequencies of vibration from the propeller motor during operation, which modifies the corresponding noise that is produced and reduces stresses on the various components. The floating portion is surrounded on all sides by isolation portions (e.g., made of elastomers or other materials) that are held within a casing that attaches to the body of the UAV. In one implementation, the motor mount assembly is modular such that one or more of the isolation portions may be replaced with different isolation portions (e.g., having different attenuation properties), depending on the direction and nature of the vibrations from the propeller motor that are to be attenuated for a particular application.

20 Claims, 7 Drawing Sheets

(56) References Cited

U.S. PATENT DOCUMENTS

| | | | | |
|---|---|---|---|---|
| 4,199,128 A | * | 4/1980 | van den Boom | F16F 13/08 |
| | | | | 267/140.13 |
| 4,489,921 A | * | 12/1984 | Martin | F16F 3/093 |
| | | | | 267/141.5 |
| 4,957,279 A | * | 9/1990 | Thorn | F16F 7/087 |
| | | | | 248/562 |
| 5,116,030 A | * | 5/1992 | Nowak | F16F 3/0876 |
| | | | | 267/140.4 |
| 5,478,044 A | | 12/1995 | Hyde | |
| 5,482,260 A | * | 1/1996 | Schmidt | F16F 1/3605 |
| | | | | 267/141 |
| 6,247,687 B1 | * | 6/2001 | Jensen | B64C 25/64 |
| | | | | 188/129 |
| 6,290,038 B1 | * | 9/2001 | Jensen | B64C 25/64 |
| | | | | 188/381 |
| 7,571,876 B2 | * | 8/2009 | Bachmeyer | B64C 25/505 |
| | | | | 188/381 |
| 7,578,465 B2 | * | 8/2009 | Bachmeyer | B64C 25/505 |
| | | | | 244/100 R |
| 2013/0158821 A1 | | 6/2013 | Ricci | G06F 9/54 |
| | | | | 701/51 |
| 2014/0070980 A1 | * | 3/2014 | Park | G01S 19/42 |
| | | | | 342/118 |
| 2014/0129060 A1 | * | 5/2014 | Cooper | B61L 15/0027 |
| | | | | 701/19 |
| 2014/0131510 A1 | * | 5/2014 | Wang | B64C 39/024 |
| | | | | 244/17.23 |
| 2014/0316671 A1 | * | 10/2014 | Okamoto | G08G 1/22 |
| | | | | 701/96 |
| 2015/0129711 A1 | | 5/2015 | Caubel | |
| 2018/0074521 A1 | * | 3/2018 | Cantrell | G05D 1/0027 |
| 2018/0094619 A1 | * | 4/2018 | Sellers | F03D 5/00 |
| 2018/0105266 A1 | * | 4/2018 | Lee | B64C 27/52 |

FOREIGN PATENT DOCUMENTS

| | | |
|---|---|---|
| CN | 203641366 U | 6/2014 |
| EP | 2599718 A1 | 6/2013 |
| FR | 2832562 A1 | 5/2007 |
| FR | 2976553 A1 | 12/2012 |
| GB | 2169754 A | 7/1986 |
| JP | 2009052569 A | 3/2009 |
| JP | 2013531573 A | 8/2013 |
| JP | 2015110413 A | 6/2015 |
| WO | 2011149544 A1 | 12/2011 |

OTHER PUBLICATIONS

Machine translation of "How to make a 'Hyde' engine mount," document as provided by https://translate.googleusercontent.com/translate_f, on Aug. 30, 2015.

"Hyde-mount for builders," as downloaded from http://www.ofremmi.info/howto/Hydemount/HydeMount.htm, on Aug. 28, 2015, pp. 1-3.

International Search Report for PCT Application No. PCT/US2016/053206 dated Dec. 12, 2016.

* cited by examiner

FLOATING MOTOR MOUNT FOR UNMANNED AERIAL VEHICLES

BACKGROUND

Unmanned aerial vehicles are continuing to increase in use. For example, unmanned aerial vehicles are often used for surveillance. While there are many beneficial uses of unmanned aerial vehicles, they also have many drawbacks. For example, relatively large and/or powerful motors may be utilized for certain types of unmanned aerial vehicles, which may produce relatively significant noise during operation. Such motors may be utilized for various reasons, such as enabling unmanned aerial vehicles to carry large amounts of weight (e.g., corresponding to numerous and/or large items to be transported, large batteries for long flight times, etc.). Due to the noise produced during operation, use of such unmanned aerial vehicles may be perceived as less desirable in certain environments (e.g., residential neighborhoods).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
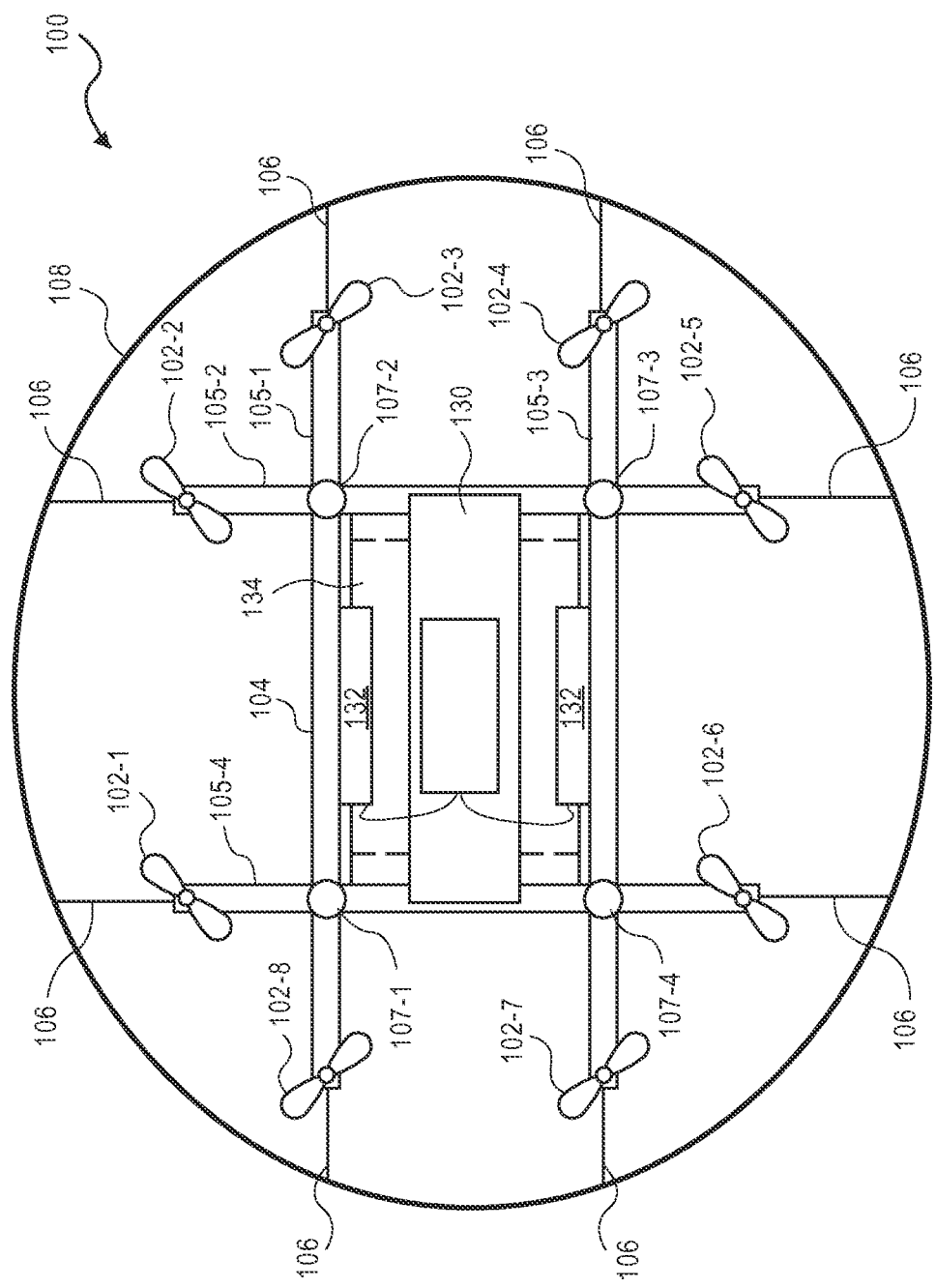
FIG. 1 depicts a block diagram of a top-down view of an unmanned aerial vehicle, according to an implementation.

While implementations are described herein by way of example, those skilled in the art will recognize that the implementations are not limited to the examples or drawings described. It should be understood that the drawings and detailed description thereof are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes a motor mount assembly for coupling a propeller motor to a body of an unmanned aerial vehicle (UAV). The motor mount assembly utilizes a floating mount and acts to attenuate vibrations from the propeller motor during operation, which modifies the corresponding noise that is produced. Such noise modification may be particularly beneficial for certain applications, such as when the UAV is utilized for delivering an ordered item to a user who may find the unmodified noise to be undesirable. The attenuation of the vibrations may also reduce various stresses that would otherwise be placed on the mechanical and electrical components of the UAV by the vibrations during operation.

In various implementations, the floating mount includes a device attachment portion and a floating portion. The device attachment portion is attached to the propeller motor and the floating portion is encased inside one or more isolation portions (e.g., made of elastomers or other materials) which help attenuate the vibrations from the propeller motor. The attenuation of such vibrations may be particularly advantageous where one or more peak frequency responses of the body of the UAV are within a range of vibrations of the propeller motor during normal operation (e.g., within a range of the blade passing frequency, etc.). More specifically, at such frequencies the body of the UAV could otherwise act to significantly amplify the vibrations from the propeller motor, if not for the attenuation of the vibrations by the isolation portions. Correspondingly, the isolation portions themselves are selected so as to not have natural harmonic frequencies that are within the range of input frequencies of vibration of the propeller motor, so as to not amplify such vibrations.

In various implementations, the isolation portions surrounding the floating portion include first and second isolation layers and an isolation tube. The first and second isolation layers are located on either side of the floating portion (e.g., above and below) in an axial direction relative to the propeller motor. The isolation tube is located around the perimeter of the floating portion and the first and second isolation layers. A casing surrounds and holds all of the isolation portions together in a stable configuration around and in contact with the floating portion. The casing includes a body attachment portion that attaches to the body of the UAV.

In various implementations, different configurations may be utilized for the isolation portions within the casing. For example, the first and second isolation layers and the isolation tube may be formed as separate isolation portions that can be individually replaced (e.g., with corresponding isolation portions made from different isolation materials). As another example, one or more of the isolation portions may be formed by injection molding of an isolation material into a corresponding area of the casing. In one implementation, the isolation material may be directly injected into the casing and around the floating portion, in which case the first and second isolation layers and the isolation tube may each be portions of a single continuous isolation material within the casing.

In various implementations, the propeller motor includes a rotating power shaft with an axis of rotation for rotating the propeller. When operating the propeller motor, axial vibrations may be produced that are generally parallel to the axis of rotation. In addition, radial vibrations may be produced that are generally perpendicular to the axis of rotation. In various implementations, the first and second isolation layers may primarily help attenuate axial vibrations, while the isolation tube may primarily help attenuate radial vibrations.

In various implementations, the modular configuration of the motor mount assembly may allow for various adjustments to be made, depending on the expected nature and direction of vibrations from the propeller motor for a particular application. For example, a UAV may experience different vibrations from the propeller motor due to various factors (e.g., the weight of an item being transported, temperature, weather conditions, the size, power, or speed of the propeller motor for a particular application, etc.). In this regard, if during testing or normal operations it is determined that different attenuation is required for either axial or radial vibrations, the corresponding isolation portions may be replaced with isolation portions with different attenuation properties (e.g., different natural harmonic frequencies, etc.).

FIG. 1 illustrates a block diagram of a top-down view of an UAV 100, according to an implementation. As illustrated in FIG. 1, the UAV 100 includes eight propellers 102-1, 102-2, 102-3, 102-4, 102-5, 102-6, 102-7, 102-8 powered by propeller motors and spaced about a body 104 of the UAV as part of a propulsion system. As will be described in more detail below with respect to FIGS. 2 and 3, in accordance with principles disclosed herein, the propeller motors may be coupled to the body 104 by respective motor mount assemblies. Each motor mount assembly may include a floating portion and may act to attenuate vibrations from the corresponding propeller motor during operation. As will be described in more detail below with respect to FIG. 7, a control system 130 is utilized for controlling the propeller motors for flying the UAV 100, as well as controlling other operations of the UAV 100.

The motors and propellers 102 may be of any type and of a size sufficient to lift the UAV 100 and any items engaged by the UAV 100 so that the UAV 100 can navigate through the air, for example, to deliver an item to a location. In one implementation, for the purpose of item transport the propeller motors may each be a FX-4006-13 740 kv multi rotor motor, and the propellers may be made of one or more suitable materials such as graphite, carbon fiber, etc. While the example of FIG. 1 includes eight motors and propellers, in other implementations, more or fewer motors and/or propellers may be utilized for the propulsion system of the UAV 100. Likewise, in some implementations, the motors and/or propellers may be positioned at different locations on the UAV 100. In addition, alternative methods of propulsion may be utilized. For example, engines, fans, jets, turbojets, turbo fans, jet engines, and the like may be used to propel the UAV.

The body 104 or frame of the UAV 100 may be of any suitable material, such as graphite, carbon fiber, and/or aluminum. In this example, the body 104 of the UAV 100 includes four rigid members 105-1, 105-2, 105-3, 105-4, or beams arranged in a hash pattern with the rigid members intersecting and joined at approximately perpendicular angles at intersection points 107-1, 107-2, 107-3 and 107-4. The propellers 102 and corresponding propeller motors are positioned at both ends of each rigid member 105. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations, some or all of the rigid members may be of different lengths. Likewise, the spacing between the two sets of rigid members may be approximately the same or different.

While the implementation illustrated in FIG. 1 includes four rigid members 105 that are joined to form at least part of the body 104, in other implementations, there may be fewer or more components to the body 104. For example, rather than four rigid members, in other implementations, the body 104 of the UAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the body 104. As discussed further below, a cavity within the body 104 may be configured to include an engagement mechanism 134 for the engagement and transport of item(s) and/or containers that contain item (s) (e.g., for the delivery of an ordered item to a user).

In some implementations, the UAV may be configured for aerodynamics. For example, an aerodynamic housing may be included on the UAV that encloses the UAV control system 130, one or more of the rigid members 105, the body 104, and/or other components of the UAV 100. The housing may be made of any suitable material(s) such as graphite, carbon fiber, aluminum, etc. Likewise, in some implementations, the engagement mechanism 134 may be configured such that, when an item is engaged, it is enclosed within the frame and/or housing of the UAV 100 so that no additional drag is created during transport of the item by the UAV 100.

Extending outward from each rigid member is a support arm 106 that is connected to a safety barrier 108. In this example, the safety barrier is positioned around and attached to the UAV 100 in such a manner that the motors and propellers 102 are within the perimeter of the safety barrier 108. The safety barrier may be plastic, rubber, etc. Likewise, depending on the length of the support arms 106 and/or the length, number or positioning of the rigid members 105, the safety barrier may be round, oval, or any other shape.

Mounted to the body 104 is the UAV control system 130. In this example, the UAV control system 130 is mounted in the middle and on top of the body 104. The UAV control system 130, as discussed in further detail below with respect to FIG. 7, controls the navigation, communication and other operations of the UAV 100. In various implementations, the UAV 100 may also include one or more power modules 132. In this example, the UAV 100 includes two power modules 132 that are removably mounted to the body 104. In various implementations, the power module(s) for the UAV may be in the form of battery power, solar power, gas power, super capacitor, fuel cell, alternative power generation source, or a combination thereof. For example, the power modules 132 may each be a 6000 mAh lithium-ion polymer battery, polymer lithium ion (Li-poly, Li-Pol, LiPo, LIP, PLI or Lip) battery. The power modules 132 are coupled to and provide power for the UAV control system 130 and the propeller motors.

As noted above, the UAV may also include an engagement mechanism 134. The engagement mechanism 134 may be configured to engage and disengage items and/or containers that hold items. In this example, the engagement mechanism 134 is positioned within a cavity of the body 104 that is formed by the intersections of the rigid members 105. The engagement mechanism 134 may be positioned beneath the UAV control system 130. In implementations with additional rigid members, the UAV may include additional engagement mechanisms and/or the engagement mechanism 134 may be positioned in a different cavity within the body 104. The engagement mechanism 134 may be of any size sufficient to securely engage and disengage items and/or containers that contain items. The engagement mechanism 134 communicates with (e.g., via wired or wireless communication) and is controlled by the UAV control system 130.

While the implementations of the UAV discussed herein utilize propellers to achieve and maintain flight, in other implementations, the UAV may be configured in other manners. For example, the UAV may include fixed wings and/or a combination of both propellers and fixed wings. In such configurations, the UAV may utilize one or more propellers to enable takeoff and landing and a fixed wing configuration or a combination wing and propeller configuration to sustain flight while the UAV is airborne.

Figure 2:
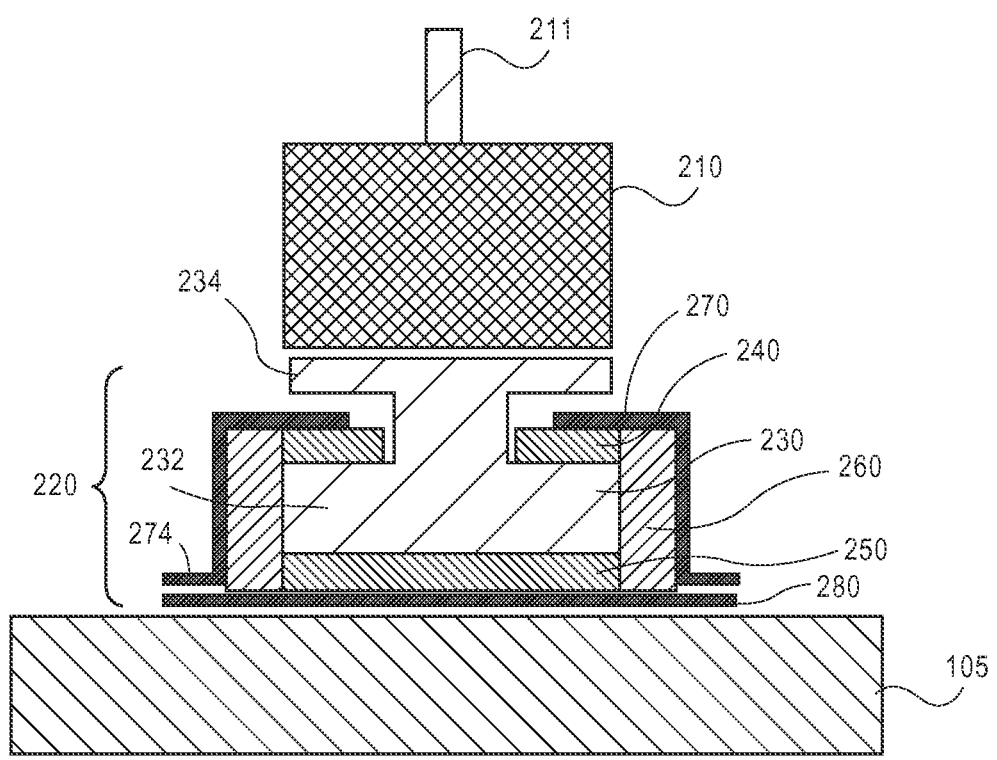
FIG. 2 depicts a diagram of a motor mount assembly including a floating mount with a device attachment portion extending through a central hole in a casing, according to an implementation.
Figure 3:
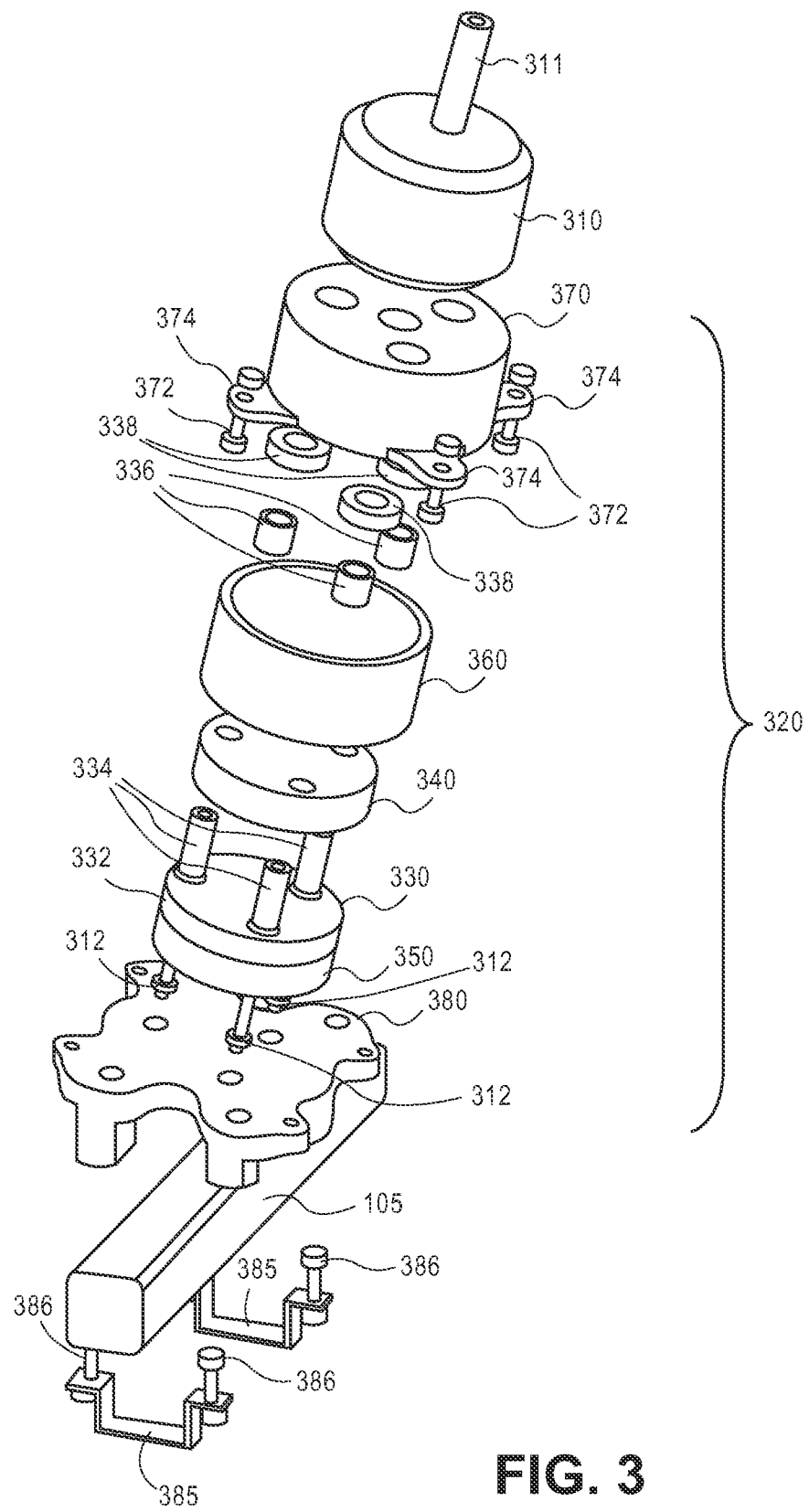
FIG. 3 depicts a diagram of a motor mount assembly including a floating mount with three device attachment portions extending through corresponding holes in a casing, according to an implementation.

FIG. 2 depicts a diagram of a motor mount assembly 220 for coupling a propeller motor 210 to a rigid member 105 of a body of a UAV, according to an implementation. The motor mount assembly 220 includes a floating mount 230, a first isolation layer 240, a second isolation layer 250, an isolation tube 260, a casing 270 and a mounting plate 280. The floating mount 230 includes a floating portion 232 and a device attachment portion 234. The device attachment portion 234 is configured for attachment to a power device that is part of the propulsion system of the UAV. In the implementation of FIG. 3, the power device is the propeller motor 210, although in alternative implementations other types of power devices, such as engines, etc. may be utilized. The floating portion 232 is located between the first and second isolation layers 240 and 250 and inside the isolation tube 260. In various implementations, the first and second isolation layers 240 and 250 and the isolation tube 260 may be formed from various types of materials, which may be selected according to various design parameters, as will be described in more detail below with respect to FIG. 5. As examples of different materials, in various implementations different types of elastomeric materials (e.g., latex rubbers, gum rubbers, neoprene, polyurethane, etc.), corks, papers, felts, etc. may be utilized.

The casing 270 surrounds and is in contact with the first and second isolation layers 240 and 250 and the isolation tube 260, which correspondingly surround and are in contact with the floating portion 232. The casing 270 includes a body attachment portion 274 that is configured for attachment to the body of the UAV. In the implementation of FIG. 2, the body attachment portion 274 is attached to the mounting plate 280 that is attached to the rigid member 105 that is part of the body of the UAV (e.g., UAV 100 of FIG. 1). The device attachment portion 234 has a "T" shaped cross section and extends through an opening in the first isolation layer 240 and an opening in the casing 270 for attaching to the propeller motor 210, which is located above the casing 270. The length and configuration of the device attachment portion 234 prevents the propeller motor 210 from coming into contact with the casing 270, which prevents the transfer of vibrations from the propeller motor 210 directly to the casing 270 that would correspondingly transfer vibrations directly to the rigid member 105 of the body of the UAV. The first and second isolation layers 240 and 250 and the isolation tube 260 surround and isolate the floating portion 232, and correspondingly prevent each respective side of the floating portion 232 from directly contacting the casing 270 and/or the mounting plate 280. This configuration thus isolates and prevents the transfer of vibrations from the floating portion 232 directly to the casing 270 and/or mounting plate 280.

One advantage of the illustrated configuration is that the casing 270 surrounds and holds all of the isolation portions 240, 250 and 260 together in a stable configuration around and in contact with the floating portion 232. In one configuration, if the casing 270 was not utilized, the isolation tube 260 may alternatively be utilized for holding the isolation layers 240 and 250 in a similar configuration. However, under certain circumstances, the utilization of the isolation tube 260 by itself for this purpose may be less desirable, in that strong forces (e.g., from the vibration, torque and/or thrust of the motor 210) may be caused to act almost exclusively on the isolation tube 260. Such could require that the isolation tube 260 be made of a material with a relatively high hardness value, wherein low hardness values may be more desirable for certain applications. For example, if the vibrations that are to be attenuated have relatively low frequencies, it may be desirable for the isolation material to have a relatively low hardness value. In the configuration of FIG. 2, the utilization of the casing 270 (e.g., made of aluminum or other materials), allows for much lower hardness values to be utilized for the material of the isolation tube 260. More specifically, the integrity of the configuration is not purely reliant on the strength of the material of the isolation tube 260, but instead on the strength of the casing 270 that holds the isolation tube 260 and which may provide a large factor of safety.

The propeller motor 210 includes a propeller shaft 211 for rotating a propeller (e.g., a propeller 102 of the UAV 100 of FIG. 1). In various implementations, the propeller shaft 211 may be designated as a rotating power shaft with an axis of rotation. During operation of the propeller motor 210, axial vibrations may be produced that are generally parallel to the axis of rotation, and radial vibrations may be produced that are generally perpendicular to the axis of rotation. In various implementations, the transfer of the vibrations of the propeller motor 210 and the attached floating portion 232 to the rigid member 105 may be attenuated by the first and second isolation layers 240 and 250 and the isolation tube 260. For example, in the configuration of FIG. 2, the first and second isolation layers 240 and 250, which are in contact with and oriented on either side of the floating portion 230 in an axial direction, may primarily attenuate axial vibrations rather than radial vibrations. In addition, the isolation tube 260, which is in contact with and radially oriented around the perimeter of the floating portion 230, may primarily attenuate radial vibrations rather than axial vibrations. As will be described in more detail below, the attenuation of the axial and radial vibrations may effectively modify the sound that is produced by the operation of the propeller motor for flying the UAV.

FIG. 3 depicts a diagram of a motor mount assembly 320 for coupling a propeller motor 310 to a rigid member 105 of a body of a UAV, according to an implementation. Certain components of the motor mount assembly 320 of FIG. 3 are similar to certain components of the motor mount assembly 220 of FIG. 2, and will be understood to operate similarly except as otherwise described below. As shown in FIG. 3, the motor mount assembly 320 includes a floating mount 330, a first isolation layer 340, a second isolation layer 350, an isolation tube 360, a casing 370 and a mounting plate 380. The floating mount 330 includes a floating portion 332 and device attachment portions 334. One difference between the implementations of FIGS. 2 and 3 is that the floating mount 330 of FIG. 3 includes three device attachment portions 334, while the floating mount 230 of FIG. 2 includes only a single device attachment portion 234 with a "T" shaped cross-section.

In various implementations, the device attachment portions 334 may in some circumstances be considered to provide more stable support and corresponding transfer of vibrations from the propeller motor 310 to the floating portion 332 than a single device attachment portion. In addition, in the illustrated configuration of FIG. 3, the device attachment portions 334 do not need to be detached from the floating portion 332 in order for the floating portion 332 to positioned within or removed from the casing 370 (e.g., in comparison to the "T" shaped cross section of the device attachment portion 234 of FIG. 2 which may require such detachment in some configurations). The first isolation layer 340 includes corresponding holes that the device attachment portions 334 extend through. The device attachment portions 334 are also shown to extend through corresponding tubing sections 336, isolation grommets 338 and holes in the casing 370 for attaching to the propeller motor 310. In various implementations, the tubing sections 336 and isolation grommets 338 help ensure that the device attachment portions 334 are isolated from the casing 370, so that vibrations from the attached propeller motor 310 are not substantially transferred to the casing 370.

As further illustrated in FIG. 3, sets of fastening elements 312, 372 and 386 may be utilized for assembling and securely attaching the various components of the motor mount assembly 320, as will be described in more detail below. In various implementations, the fastening elements 312, 372 and 386 may be any type of fastening elements that are capable of performing the various fastening functions (e.g., screws, bolts, etc.). In some implementations, the fastening elements 312, 372 and 386 may allow the various components to be assembled and secured without requiring the use of certain types of adhesives (e.g., glues, etc.). For various applications, the fastening elements may be considered to be more secure (e.g., less likely to come apart during high stress operations) than certain types of adhesives. In addition, use of such adhesives may in some configurations inhibit the disassembly and replacement of various components. In contrast, the utilization of the various fastening elements 312, 372 and 386, which may be easily fastened and unfastened, allows the individual isolation portions and/or the motor mount assembly as a whole to be easily accessed and replaced. This modular configuration may be particularly desirable for certain applications, such as when modifications are to be made for achieving different vibration attenuation characteristics (e.g., by replacing or modifying one or more of the isolation portions 340, 350 or 360, etc.).

With regard to the specific assembly illustrated in FIG. 3, the fastening elements 372 are utilized for securely attaching the body attachment portions 374 of the casing 370 to the mounting plate 380. The fastening elements 386, along with a set of brackets 385, are utilized for securely attaching the mounting plate 380 to the rigid member 105. The fastening elements 312 are shown to extend up through the device attachment portions 334 for securely attaching the propeller motor 310 to the ends of the device attachment portions 334. In various implementations, the fastening elements 312 and/or device attachment portions 334 may have a sufficient length or may otherwise be configured at the top for providing a spacing between the propeller motor 310 and the casing 370, so as to prevent the propeller motor 310 from resting on or otherwise being in direct contact with the casing 370. This spacing from the propeller motor 310 prevents the direct transfer of vibrations from the propeller motor 310 to the casing 370 and to the attached rigid member 105. In various implementations, the fastening elements 312 may include heads that may be located within recesses in the bottom of the second isolation layer 350 and/or within recesses of the mounting plate 380, without directly contacting the mounting plate 380. The lack of contact with the mounting plate 380 again prevents the substantial transfer of vibrations from the propeller motor 310 and the attached fastening elements 312 to the mounting place 380 and to the attached rigid member 105.

Similar to the propeller motor 210 described above with respect to FIG. 2, the propeller motor 310 of FIG. 3 includes a propeller shaft 311 for rotating a propeller. In various implementations, the transfer of the vibrations of the propeller motor 310 and the attached floating portion 332 to the rigid member 105 may be attenuated by the first and second isolation layers 340 and 350 and the isolation tube 360. For example, the first and second isolation layers 340 and 350, which are in contact with and oriented on either side of the floating portion 330 in an axial direction, may primarily attenuate axial vibrations rather than radial vibrations. In addition, the isolation tube 360, which is in contact with and radially oriented around the perimeter of the floating portion 330, may primarily attenuate radial vibrations rather than axial vibrations.

Figure 4A:
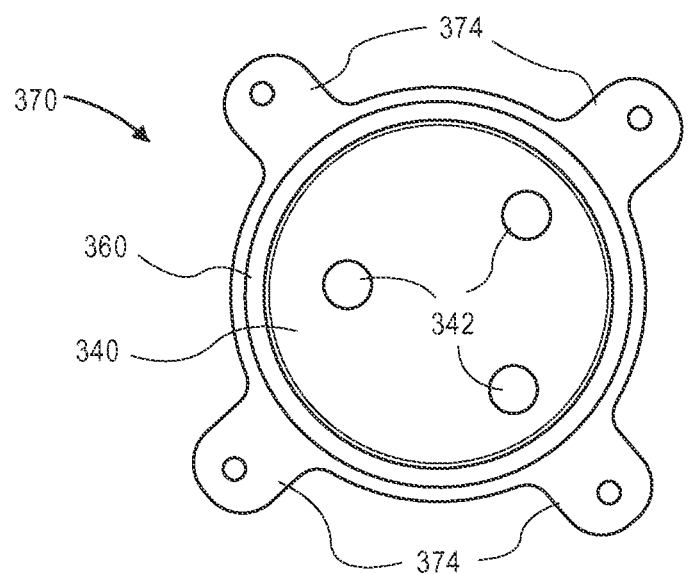
FIGS. 4A and 4B depict diagrams of the casing of FIG. 3, according to an implementation.
Figure 4B:
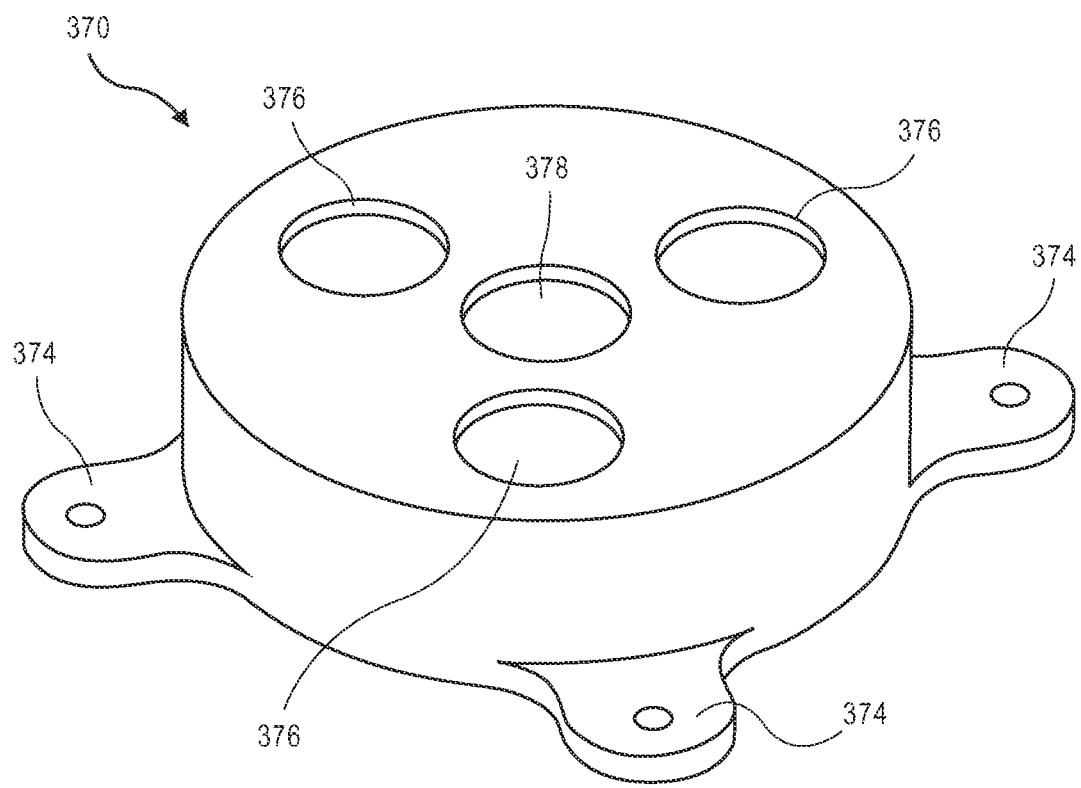

FIGS. 4A and 4B depict diagrams of the casing 370 of FIG. 3, according to an implementation. FIG. 4A is a bottom view of the casing 370, illustrating the position of the first isolation layer 340 and the isolation tube 360 that are contained within the casing 370. Openings 342 (e.g., in the form of holes) are illustrated in the first isolation layer 340, through which the device attachment portions 334 extend for attaching to the propeller motor 310 on the other side of the first isolation layer 340 and the casing 370, as described above with respect to FIG. 3. FIG. 4B is a top view of the casing 370, illustrating openings 376 (e.g., in the form of holes) through which the device attachment portions 334 extend upward for attaching to the propeller motor 310, as described above with respect to FIG. 3. An opening 378 is provided to accommodate an extension of the propeller motor 310 that may extend downward. The downward extension of the propeller motor 310 is positioned within the opening 378 so as to not contact the casing 370. As described above with respect to FIG. 3, the body attachment portions 374 are utilized for attaching the casing 370 to the mounting plate 380. The casing 370 is configured so that it can be relatively easily removed from the mounting plate 380 by unfastening the fastening elements 372 from the body attachment portions 374, which simplifies the process for replacing or modifying any of the components within the motor mount assembly 320.

While the implementations of FIGS. 2-4 illustrate certain example configurations, it will be appreciated that other configurations may also be utilized. For example, in one alternative implementation, a portion of the rigid member 105 may be hollow and may be utilized as the casing. In such a configuration, isolation portions may be injected or placed inside the casing portion of the rigid member and may surround a floating portion of a floating mount. A device attachment portion of the floating mount may extend through an opening in the casing portion of the rigid member for attaching to a power device (e.g., a propeller motor), similar to the configurations of the floating mount illustrated in FIGS. 2 and 3. The edges of the casing portion of the rigid member may be designated as body attachment portions that are attached to (e.g., part of) the rest of the rigid member and/or otherwise attached to the rest of the body of the UAV.

It will be appreciated that other configurations for motor mount assemblies may similarly be envisioned based on the principles disclosed herein.

Figure 5:
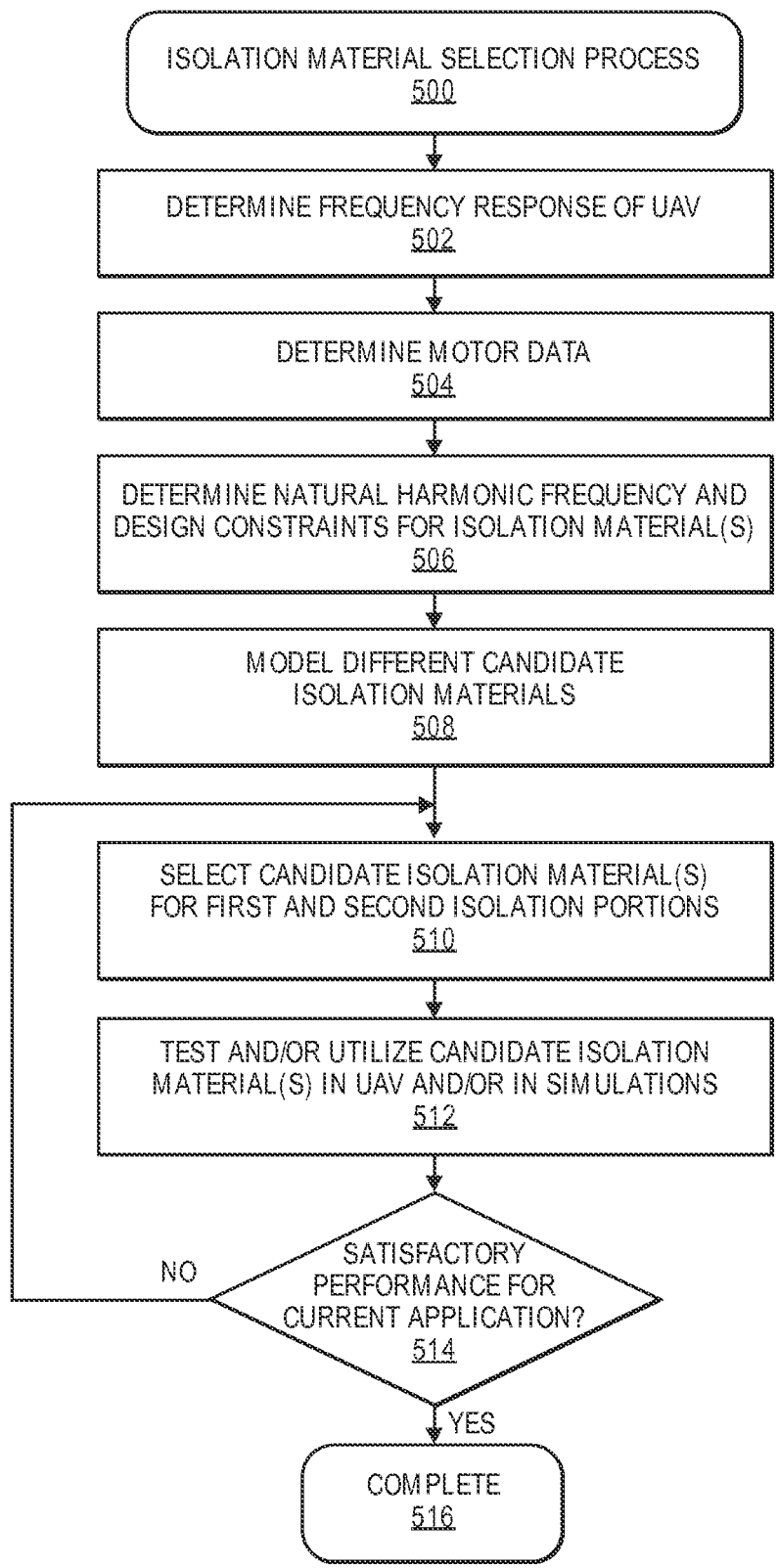
FIG. 5 is a flow diagram illustrating an example process for selecting an isolation material to utilize in conjunction with a floating mount, according to an implementation.

FIG. 5 is a flow diagram illustrating an example process 500 for selecting an isolation material to utilize in conjunction with a floating mount, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

With respect to the example process of FIG. 5 for the selection of the isolation materials, in various implementations the motor mount assembly may include one, two, or more isolation materials that may be selected. In various implementations, the isolation portions may be made of the same isolation material or may be made of different isolation materials. For example, with respect to the configurations of FIGS. 2 and 3, the first and second isolation layers and the isolation tube may be formed as separate isolation portions that can be individually added and removed. In one implementation, a first isolation portion (e.g., including the first and second isolation layers) may be designated for primarily attenuating axial vibrations, for which a one or more isolation materials may be selected (e.g., the first and second isolation layers may be made of different isolation materials or the same isolation material). Correspondingly, a second isolation portion (e.g., including the isolation tube) may be designated for primarily attenuating radial vibrations, for which an isolation material may be selected that is the same or different than the isolation materials that are selected for the first isolation portion.

As another example, one or more of the isolation portions may be formed by injection molding of an isolation material into a corresponding area of the casing. In one implementation, the isolation material may be injected into the casing and around the floating portion, in which case the first and second isolation layers and the isolation tube may each be portions of a single continuous isolation material within the casing. Alternatively, different injection and/or other processes may be utilized for forming each of the first and second isolation layers and the isolation tube separately. In various implementations, an isolation material with varying characteristics and/or multiple isolation materials may be utilized as part of the injection process. For example, a gradient style fill may be utilized, wherein a characteristic (e.g., the hardness, etc.) of the isolation material may be made to vary over the course of the injection process and correspondingly to vary at different locations within the casing. As part of the injection process, different types of isolation materials (e.g., different types of urethane, etc.) may be injected at the same time and/or otherwise mixed. It will be appreciated that other configurations for the isolation materials may similarly be envisioned based on the principles disclosed herein.

As shown in FIG. 5, the example process for the selection of the isolation materials begins with a determination of a frequency response of a UAV, as in 502. In various implementations, such frequency response information may be utilized for various purposes. For example, such frequency response information may be utilized to determine if a peak frequency response of the UAV is within a range of a blade passing frequency (e.g., for the rotation of a propeller by a motor during normal operation), such as could cause the body of the UAV to amplify the corresponding vibrations from the motor. If so, it may be correspondingly advantageous to select a configuration and isolation materials for the motor mount assembly that act to attenuate the vibrations at such frequencies. As a specific illustrative example, if peak frequency responses for various portions of the UAV body are determined to be at approximately 260 Hz, 360 Hz and 400 Hz, it may be desirable to select isolation materials that act to particularly attenuate the vibrations at those frequencies.

Once the frequency response of the UAV is determined, data for the propeller motor is determined, as in 504. For example, as described above, blade passing frequencies and other operational data regarding the motor (e.g., including operating speeds, expected vibrations and directions, etc.) may be important factors for the selection of materials for attenuating the vibrations. In various implementations, such motor data may be obtained from various sources (e.g., physical tests of the motor, simulations, data sheets, etc.). Once the motor data is determined, a natural harmonic frequency and design constraints are determined for the isolation materials, as in 506. In various implementations, a transmissibility crossover frequency of an isolation material may be determined as related to potential frequencies of vibration from the motor. For example, it may be undesirable for an input vibration frequency from the motor to move through the natural harmonic frequency of an isolation material, such as could cause large and undesirable stresses to be placed on the isolation material. In addition to the initially selected isolation materials (e.g., for first and second isolation portions), any replacement isolation materials that are subsequently chosen may similarly be selected so as to have a natural harmonic frequency that does not fall within a range of frequencies of vibration of the motor.

In various implementations, weight and dimension constraints may also be determined (e.g., based on a geometry and weight budget of the UAV, etc.). With respect to weight and forces on the isolation material, it has been experimentally determined that in some implementations the effective natural harmonic frequency of the isolation material may move lower as the weight increases. During landing and take-off portions of a flight path, increased force may be experienced on the isolation material, which may correspondingly make the effective natural harmonic frequency lower. This lowering of the effective natural harmonic frequency may be advantageous in various implementations, in that it may allow the isolation material to attenuate the vibrations of the motor (e.g., which may be above the natural harmonic frequency of the isolation material) more effectively during the landing and take-off portions of the flight path. It is noted that in various implementations, these same portions of the flight path may be ones where there is the closest user-interaction (e.g., for a user receiving an item being delivered), for which the corresponding attenuations of the vibrations may be particularly desirable (e.g., to modify the noise from the propeller motor so as to make it less objectionable to the user). As will be described in more detail below with respect to FIG. 6, data regarding the current weight, forces, temperature, etc. which may affect the noise modification characteristics of the motor mount assembly (e.g., as related to natural harmonic frequencies, etc.) may be utilized to determine an optimal operating frequency, etc. for the motor during a noise modification procedure.

Once the natural harmonic frequency and design constraints have been determined, different candidate isolation materials are modeled, as in 508. In various implementations, different techniques may be utilized for the modeling. For example, a Kelvin-Voigt technique may be utilized to model a candidate isolation material as a viscoelastic material. In addition, various calculations (e.g., for loss factors, damping ratios, etc.) may be performed for the needed characteristics for isolating and attenuating the determined frequencies (e.g., at the peak frequency responses of the UAV, etc.).

Once the different candidate isolation materials have been modeled, candidate isolation materials are selected for first and second isolation portions, as in 510. As noted above, in one implementation a first isolation portion (e.g., including first and second isolation layers) may be designated for primarily attenuating axial vibrations, while a second isolation portion (e.g., including an isolation tube) may be designated for primarily attenuating radial vibrations. In various implementations, multiple isolation materials may be selected for the first and/or second isolation portions. For example, first and second isolation layers that are part of the first isolation portion may each be made of different isolation materials or may be made of the same isolation material. In various implementations, combinations of isolation materials may also be utilized. For example, injection molding may be performed into the casing utilizing different isolation materials (e.g., different types of urethane, etc.) that are injected at the same time and/or are otherwise mixed to form the first and/or second isolation portions or any portions thereof.

In various implementations, the selection of the isolation materials may be based on various factors. For example, the isolation materials may be selected at least in part based on a calculation of a needed material hardness with the desired attenuation properties. The materials may be selected according to various ranges (e.g., materials that are available in a desired range of hardness values that remain stable within an expected range of temperature changes during normal operation, etc.). As one specific illustrative example, neoprene rubber with a shore A hardness of 30 durometers may be selected as one candidate isolation material for a particular application.

Once the candidate isolation materials are selected, the candidate isolation materials are tested and/or utilized in the UAV and/or in simulations, as in 512. For example, a non-linear analysis may be run utilizing the initial design values. As another example, initial prototypes may be created (e.g., by laser cutting, water jetting, etc.) of the candidate isolation materials for utilization and/or testing. The prototypes may be tested utilizing various types of equipment (e.g., on a shaker table with a sweeping frequency input, etc.). The prototypes may also or alternatively be utilized in a UAV during normal operations, wherein various sensors may be utilized (e.g., for measuring the performance of the materials, the vibrations, etc.).

Once the candidate isolation materials have been utilized and/or tested, a determination is made as to whether the performance is satisfactory, as in 514. If the performance is not satisfactory, the process returns to the block 510, where other candidate isolation materials may be selected. If the performance is determined to be satisfactory, as in 514, the process completes, as in 516. In various implementations, the determination as to whether the performance is satisfactory may be made based on various factors. For example, a physical measurement of the attenuation of the vibration that is achieved may be made, which may be compared to a desired level of attenuation.

In various implementations, psychoacoustic metrics may also or alternatively be utilized as part of the determination as to whether the performance is satisfactory. For example, some of the psychoacoustic metrics that may be utilized may include roughness, sharpness, tonality, loudness, fluctuation, etc. In various implementations, each of these example psychoacoustic metrics may be defined by particular characteristics. For example, roughness may be proportional to the frequency of modulation, and may be related to frequency resolution and the temporal resolution of hearing. Sharpness may be influenced mainly by spectral content and center frequency of narrow-band sounds. Tonality may be a relatively subjective metric that has no formal equation for determining its value. Loudness may have equal contour lines on a sound pressure vs. frequency plot, and may be related to sound intensity but may also be dependent on other factors. Fluctuation may be related to modulation frequency and may increase with sound pressure. As a specific illustrative example, in one implementation the following equation may be utilized for evaluating pleasantness P:

$$P/P_0 = (e^{-0.7R/R_0})(e^{-1.08S/S_0})(1.24 - e^{-2.43T/T_0})(e^{-(0.023N/N_0)^2})$$ (Eq. 1)

With respect to Equation 1, P=pleasantness (dimensionless), R=roughness (asper), S=sharpness (acum), T=tonality (dimensionless) and N=loudness (sone). $P/P_0$ may be designated as a sensory pleasantness ratio, wherein $P_0$ may indicate a pleasantness value related to the noise that is produced by the operation of a UAV utilizing a first motor mount assembly, and P may indicate a pleasantness value related to the noise that is produced by the operation of the UAV utilizing a second motor mount assembly. In general, if $P/P_0 > 1$, then P is indicated as being more pleasant than $P_0$. In various implementations, a determination as to whether the performance of a new motor mount that is being tested is satisfactory may be made based at least in part on whether the sensory pleasantness ratio $P/P_0$ indicates sufficient improvement over another motor mount.

Figure 6:
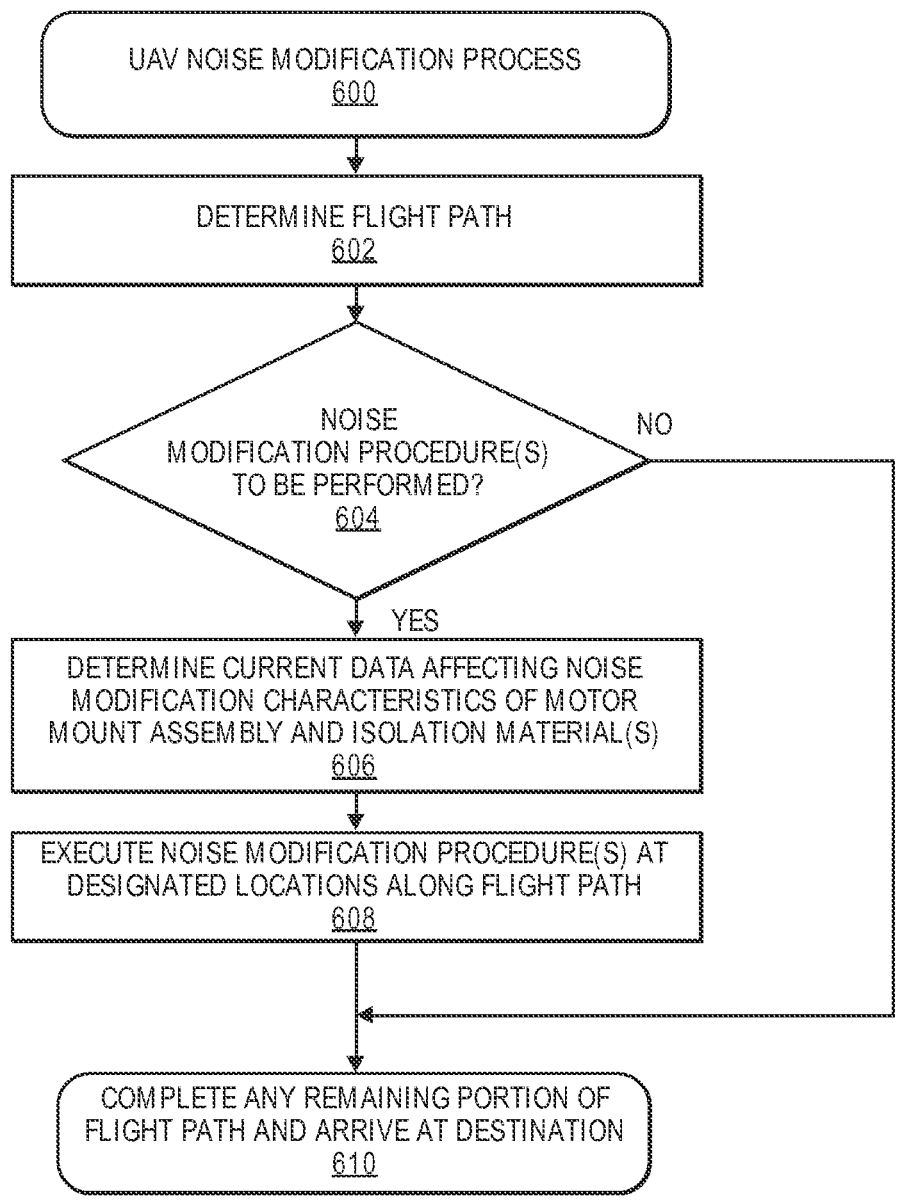
FIG. 6 is a flow diagram illustrating an example process for noise modification in an unmanned aerial vehicle, according to an implementation.

FIG. 6 is a flow diagram illustrating an example process 600 for noise modification in a UAV, according to an implementation. The example process begins with a determination of a flight path for the UAV, as in 602. In various implementations, the starting point for the flight path (e.g., a current location of the UAV) may be associated with a materials handling facility, a delivery location after a delivery has been completed, etc. As part of the navigation for the flight path, the UAV may follow the designated route, and may also have capabilities for sensing and reacting to any dynamic events that may occur (e.g., avoiding any obstacles such as other UAVs, structures, etc.).

Before or after a departure along the flight path, a determination is made as to whether one or more noise modification procedures will be performed, as in 604. In various implementations, noise modification procedures may be performed during parts of the flight path where noise modification is particularly desirable. For example, users receiving delivery of items may be in closest proximity to the UAV during landing and takeoff portions of a flight path, as a result of which it may be desirable to perform noise modification procedures at such times.

If noise modification procedures are to be performed, current data affecting the noise modification characteristics of the motor mount assembly and isolation materials is determined, as in 606. For example, data regarding the current amount of weight being carried by the UAV, the expected thrust required at takeoff and landing, current temperatures, current weather conditions, etc. may affect the noise modification characteristics of the motor mount assembly and isolation materials. In various implementations, data regarding such factors (e.g., as received from remote computing resources, determined by sensors, etc.) may be utilized as part of noise modification procedures for selecting an operating speed (e.g., RPM of the motor) that will produce the most desirable results for the noise modification during a particular portion of the flight path (e.g., during landing, take off, etc.). As a specific example, data regarding temperature and/or an amount of weight (e.g., during landing when an item is being delivered or takeoff after an item has been dropped off) may be determined. Such data may then be utilized, along with the known effect of such temperature and/or weight on the frequency response of the motor mount assembly and isolation materials, to determine an optimal operating speed for producing the most desirable results (e.g., as measured by a value of pleasantness P in accordance with Equation 1 above).

Once the current data is determined, the noise modification procedures are executed at the designated locations along the flight path, as in 608. In various implementations, if the noise modification procedures are to be performed at different times (e.g., during landing, take off, etc.), the current data may be determined at the time when each noise modification procedure is to be executed. Once the noise modification procedures have been executed, as in 608, or if no noise modification procedures are to be performed, as in 604, any remaining portion of the flight path is completed and the UAV arrives at its destination, as in 610.

Figure 7:
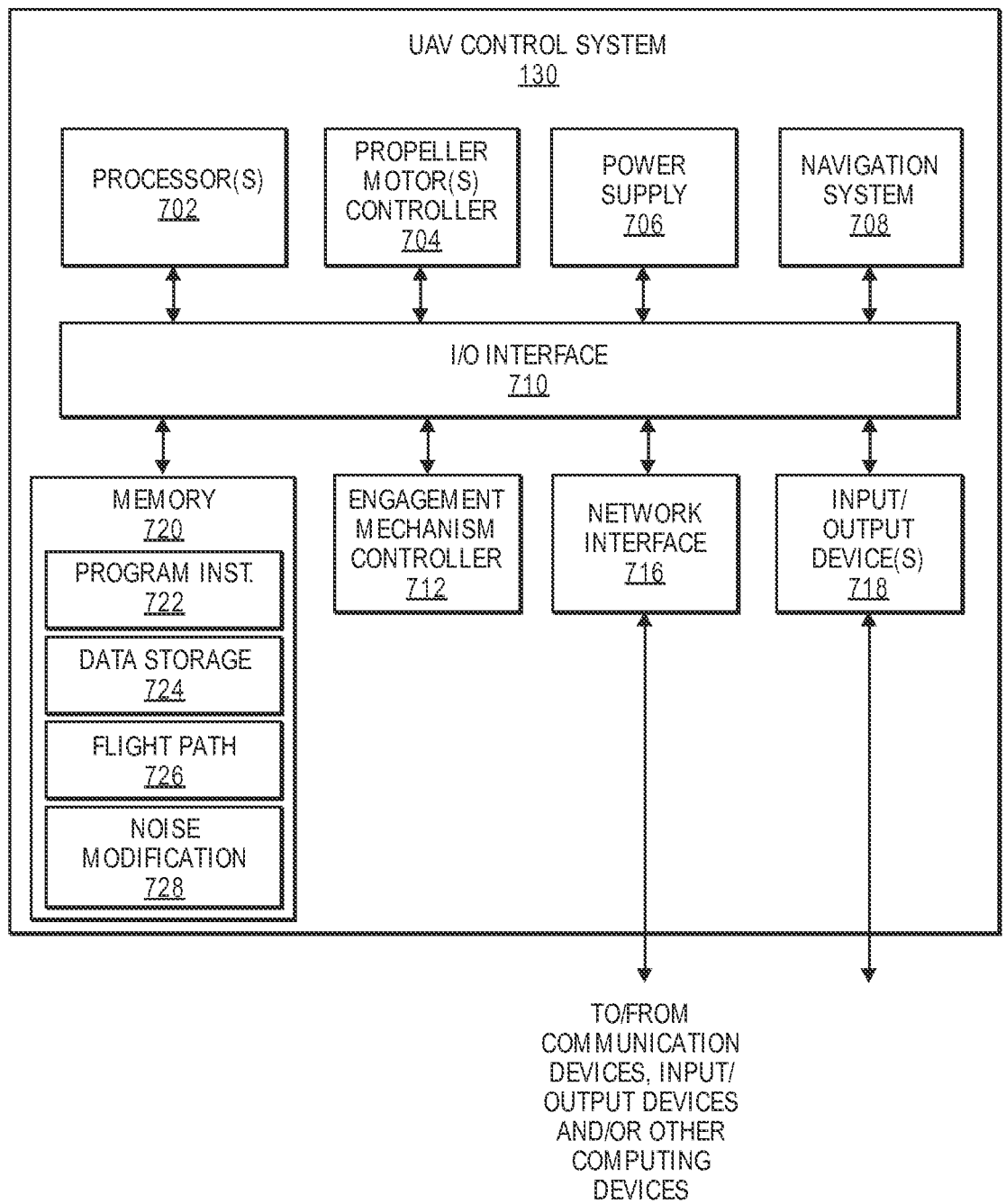
FIG. 7 is a block diagram illustrating various components of an unmanned aerial vehicle control system, according to an implementation.

FIG. 7 is a block diagram illustrating an example UAV control system 130 of a UAV 100. In various examples, the block diagram may be illustrative of one or more aspects of the UAV control system 130 that may be used to implement the various systems and methods discussed above. In the illustrated implementation, the UAV control system 130 includes one or more processors 702, coupled to a non-transitory computer readable storage medium 720 via an input/output (I/O) interface 710. The UAV control system 130 may also include a propeller motor controller 704, power supply module 706, and/or a navigation system 708. The UAV control system 130 further includes an engagement mechanism controller 712, a network interface 716, and one or more input/output devices 718.

In various implementations, the UAV control system 130 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724, flight path data 726 and noise modification instructions 728, respectively. In other implementations, program instructions, flight path data, noise modification data and/or other data may be received, sent, or stored upon different types of computer-accessible media, such as non-transitory media, or on similar media separate from the non-transitory computer readable storage medium 720 or the UAV control system 130. Generally speaking, a non-transitory, computer readable storage medium may include storage media or memory media such as magnetic or optical media, e.g., disk or CD/DVD-ROM, coupled to the UAV control system 130 via the I/O interface 710. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The propeller motor(s) controller 704 communicates with the navigation system 708 and adjusts the power of each propeller motor to fly the UAV along a determined flight path. The navigation system 708 may include a GPS or other similar system than can be used to navigate the UAV to and/or from a location. As described above, in various implementations, the UAV may be flown at various times utilizing noise modification procedures, as per the noise modification instructions 728. The power supply module 706 may control the charging and any switching functions associated with one or more power modules (e.g., batteries) of the UAV.

The engagement mechanism controller 712 communicates with the motor(s) (e.g., a servomotor) used to engage and/or disengage items to be carried during flights. The network interface 716 may be configured to allow data to be exchanged between the UAV control system 130 and other devices attached to a network, such as other computer systems. In various implementations, the network interface 716 may support communication via wireless general data networks, such as a Wi-Fi network. For example, the network interface 716 may support communication via telecommunications networks such as cellular communication networks, satellite networks, and the like.

Input/output devices 718 may, in some implementations, include one or more displays, image capture devices, thermal sensors, infrared sensors, time of flight sensors, accelerometers, pressure sensors, airflow sensors, speed sensors, vibration sensors, noise sensors, weight sensors, temperature sensors, etc. For example, such sensors may be utilized for measuring certain aspects during a noise modification procedure, such as vibrations, sound, speed, weight, temperature, etc. Multiple such input/output devices 718 may be present and controlled by the UAV control system 130. Certain sensors may also be utilized to assist with navigation, landings, avoiding obstacles during flight, etc.

As shown in FIG. 7, the memory may include program instructions 722 that may be configured to implement the example processes and/or sub-processes described above. The data storage 724 may include various data stores for maintaining data items that may be provided for determining flight paths, landing, executing noise modification procedures, etc. The noise modification instructions 728 may be configured to implement the example noise modification procedures described above. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 130 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 130 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 130. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 130 may be transmitted to the UAV control system 130 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A mount assembly that couples a propeller motor to a body of an unmanned aerial vehicle (UAV), the mount assembly comprising:
a floating mount comprising a floating portion and at least three device attachment portions, wherein the at least three device attachment portions are substantially evenly spaced about a center of the floating mount and wherein each device attachment portion is configured to attach to the propeller motor;
a casing comprising a body attachment portion that is configured for attachment to the body of the UAV; and
an isolation portion that is in contact with the floating portion, wherein:
the isolation portion is located around the floating portion and is contained within the casing;
the isolation portion includes a first isolation layer, and when the at least three device attachment portions are attached to the propeller motor, the first isolation layer is located between the propeller motor and the floating portion; and
the first isolation layer is contained within the casing and includes at least three openings, and at least part of each device attachment portion extends through a respective opening in the first isolation layer.

2. The mount assembly of claim 1, wherein the isolation portion includes a tube of elastomeric material that is located around at least a perimeter of the floating portion.

3. The mount assembly of claim 1, wherein the isolation portion includes an elastomeric material that has been injected inside the casing around the floating portion.

4. The mount assembly of claim 1, wherein the body attachment portion is one of a plurality of body attachment portions, and the casing comprises the plurality of body attachment portions that each attach to the body of the UAV.

5. The mount assembly of claim 4, wherein each of the body attachment portions is disposed at a different location on the casing for attaching to the body of the UAV.

6. A mount assembly for coupling a propeller motor to a body of an unmanned aerial vehicle (UAV), the mount assembly comprising:
a floating mount comprising:
a floating portion; and
at least three device attachment portions that are substantially evenly spaced about a center of the floating mount and that are configured for attachment to the propeller motor which has a rotating power shaft with an axis of rotation, wherein axial vibrations that are produced by the propeller motor are generally parallel to the axis of rotation, and radial vibrations that are produced by the propeller motor are generally perpendicular to the axis of rotation;
a first isolation portion that is in contact with the floating portion and which is configured to attenuate axial vibrations and includes at least three openings, wherein at least part of each device attachment portion extends through a respective opening in the first isolation portion; and
a second isolation portion that is in contact with the floating portion and which is configured to attenuate radial vibrations.

7. The mount assembly of claim 6, wherein the first isolation portion includes first and second isolation layers that the floating portion is located between and the first isolation layer includes the at least three openings, and the second isolation portion surrounds a perimeter of the floating portion.

8. The mount assembly of claim 6, further comprising a casing that surrounds the first and second isolation portions and that includes a body attachment portion that is configured for attachment to the body of the UAV.

9. The mount assembly of claim 8, further comprising a fastening element that when fastened attaches the body attachment portion to the body and that when unfastened allows the casing to be removed so as to provide access for replacing at least one of the first or second isolation portions.

10. The mount assembly of claim 8, wherein the body attachment portion is one of a plurality of body attachment portions, and the casing comprises the plurality of body attachment portions that each attach to the body of the UAV.

11. The mount assembly of claim 10, wherein each of the body attachment portions is disposed at a different location on the casing for attaching to the body of the UAV.

12. The mount assembly of claim 6, wherein at least one of the first and second isolation portions is configured to attenuate vibrations at a first frequency, and the mount assembly is coupled to the propeller motor which has a first range of frequencies of vibration during operation that includes the first frequency.

13. The mount assembly of claim 6, further comprising a replacement isolation portion that is utilized to replace at least one of the first or second isolation portions and that is configured to have different attenuation properties for attenuating vibrations than the first and second isolation portions.

14. A mount assembly that couples a propeller motor that has a rotating power shaft with an axis of rotation to a body of an unmanned aerial vehicle (UAV), the mount assembly comprising:
a casing comprising a body attachment portion that attaches to the body of the UAV;
a floating mount comprising:
a floating portion that is located inside the casing; and
at least three device attachment portions that are substantially evenly spaced about a center of the floating mount and that couple to the propeller motor; and
an isolation portion that isolates the floating portion from the body attachment portion and includes at least three openings, wherein at least part of each device attachment portion extends through a respective opening in the isolation portion.

15. The mount assembly of claim 14, wherein the isolation portion includes a first isolation layer that includes the at least three openings, and when the at least three device attachment portions are coupled to the propeller motor, the first isolation layer is located between the propeller motor and the floating portion.

16. The mount assembly of claim 14, wherein the isolation portion includes an elastomeric material that is located around at least a perimeter of the floating portion.

17. The mount assembly of claim 14, further comprising a fastening element that when fastened attaches the body attachment portion to the body of the UAV and that when unfastened allows the casing to be removed to provide access for replacing at least part of the isolation portion.

18. The mount assembly of claim 14, wherein the isolation portion is configured to attenuate vibrations at a first frequency, and the mount assembly is coupled to the propeller motor which has a first range of frequencies of vibration during operation that includes the first frequency.

19. The mount assembly of claim 14, wherein the body attachment portion is one of a plurality of body attachment portions, and the casing comprises the plurality of body attachment portions that each attach to the body of the UAV.

20. The mount assembly of claim 19, wherein each of the body attachment portions is disposed at a different location on the casing for attaching to the body of the UAV.

* * * * *